(12) United States Patent
Shivappa et al.

(10) Patent No.: US 12,140,454 B2
(45) Date of Patent: Nov. 12, 2024

(54) WIRELESS WATER ACTIVATED LIGHTS

(71) Applicant: GOODRICH CORPORATION, Charlotte, NC (US)

(72) Inventors: Chethana Shivappa, Bangalore (IN); Vinod Kumar Shivalinga, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 118 days.

(21) Appl. No.: 17/850,801

(22) Filed: Jun. 27, 2022

(65) Prior Publication Data
US 2023/0314174 A1 Oct. 5, 2023

(30) Foreign Application Priority Data
Apr. 1, 2022 (IN) .............................. 202241019965

(51) Int. Cl.
*G01D 5/02* (2006.01)
(52) U.S. Cl.
CPC ...................................... *G01D 5/02* (2013.01)
(58) Field of Classification Search
None
See application file for complete search history.

(56) References Cited

U.S. PATENT DOCUMENTS

| | | | | |
|---|---|---|---|---|
| 3,280,549 A * | 10/1966 | Hsu | ........................... | B63C 9/20 91/1 |
| 5,025,247 A * | 6/1991 | Banks | ................ | G08B 21/0288 340/539.11 |
| 5,059,952 A | 10/1991 | Wen | | |
| 5,199,374 A * | 4/1993 | Blanchette | .............. | B63B 22/12 116/210 |
| 5,710,989 A * | 1/1998 | Flood | ................... | G08B 25/016 455/100 |
| 5,842,346 A * | 12/1998 | Hsu | ........................... | F03G 7/06 60/721 |
| 9,460,602 B2 * | 10/2016 | Calhoun | .............. | G08B 21/088 |
| 9,619,977 B2 * | 4/2017 | Graham | ................. | G08B 5/002 |
| 10,107,489 B2 | 10/2018 | Van Grunsven et al. | | |
| 10,693,149 B2 | 6/2020 | Sassen et al. | | |
| 2016/0272287 A1 | 9/2016 | Covelli et al. | | |
| 2019/0333356 A1 | 10/2019 | Boyle | | |

OTHER PUBLICATIONS

European Patent Office, European Search Report dated Sep. 15, 2023 in Application No. 23162150.9.
Youtube, "Insoftb Compressed Towel Tablets, Disposable Washcloth", https://www.youtube.com/watch?v=WghYvOBDOs0, p. 1.

(Continued)

*Primary Examiner* — K. Wong
(74) *Attorney, Agent, or Firm* — SNELL & WILMER L.L.P.

(57) ABSTRACT

The present disclosure provides a water activated transmitter assembly configured to provide a signal to a wireless light assembly when the water activated transmitter assembly is exposed to water. A water emergency device system is also disclosed, which comprises the water activated transmitter assembly and the wireless light assembly coupled to a water flotation device. A method of manufacture of the water activated transmitter assembly is also disclosed.

20 Claims, 7 Drawing Sheets

(56) References Cited

OTHER PUBLICATIONS

Youtube, "Insoftb Compressed Towel Tablets, Disposable Washcloth", https://www.youtube.com/watch?v=WghYvOBDOs0, p. 1, Jul. 4, 2020.

Screen captures from Youtube video clip entitled, "Insoftb Compressed Towel Tablets, Disposable Washcloth", 4 pages, uploaded Jul. 4, 2020 by user "Product Peeks". Retrieved from Internet on Jun. 29, 2022: https://www.youtube.com/watch?v=WghYvOBDOs0, Jul. 4, 2020.

\* cited by examiner

WIRELESS WATER ACTIVATED LIGHTS

CROSS-REFERENCE TO RELATED APPLICATIONS

This application claims priority to, and the benefit of, India Patent Application No. 202241019965, filed Apr. 1, 2022 and titled "WIRELESS WATER ACTIVATED LIGHTS," which is incorporated by reference herein in its entirety for all purposes.

FIELD

The present disclosure relates generally to wireless water activated light system, and more specifically to wireless water activated light systems for emergency devices.

BACKGROUND

Many aircraft have emergency flotation devices for use in water emergencies. Water activated lights are often attached to the emergency flotation devices to assist in search and rescue during a water emergency. These water activated lights comprise a wired system which can fail due to wire breakage during installation of the water activated lights and/or upon deployment of the emergency flotation device. Additionally, installation of water activated lights with a wired system is often associated with production of fabric tunnels to hold the wire, which adds weight in materials and time needed to manufacture the emergency flotation device.

SUMMARY

A water activated transmitter assembly is disclosed herein. In various embodiments, the water activated transmitter assembly can comprise a casing, a cap coupled to the casing to form a cavity, a signal transmitter disposed within the cavity, a pusher block disposed within the cavity distal to the battery, and a hygroscopic block disposed within the cavity distal to the pusher block. The battery can be disposed distally to the signal transmitter and biased away from the signal transmitter by a spring. In various embodiments, the cap can comprise an opening configured to fluidly couple the hygroscopic block with an ambient environment. The hygroscopic block can comprise a dry compressed towel, a dry compressed cloth, and/or a dry sponge. The hygroscopic block can be configured to expand with an expansion force and the expansion force can urge the battery to move proximally toward the signal transmitter. The expansion force can be double the spring force.

In various embodiments, the water activated transmitter assembly can further comprise an O-ring disposed within the cavity and in contact with the pusher block. The O-ring can create a seal within the casing to prevent water from entering the cavity. In various embodiments, the signal transmitter is configured to transmit an output signal. The output signal can comprise a low frequency RF signal.

A water emergency device system is disclosed herein in various embodiments, the water emergency device system can comprise a water flotation device, a water activated transmitter assembly coupled to the water flotation device, and a wireless light assembly coupled to the water flotation device. The water activated transmitter assembly can comprise a casing, a cap coupled to the casing to form a cavity, a signal transmitter disposed within the cavity, a pusher block disposed within the cavity distal to the battery, and a hygroscopic block disposed within the cavity distal to the pusher block. The battery can be disposed distally to the signal transmitter and biased away from the signal transmitter by a spring. The flotation device can be a raft. The water activated transmitter assembly can further comprise an O-ring disposed within the cavity and in contact with the pusher block.

In various embodiments, the wireless light assembly can comprise a light and a battery control unit coupled to the light. The battery control unit can comprise a signal receiver, a processor in communication with the signal receiver and a switch, and a light battery, in communication with the switch and the light. In various embodiments, the signal transmitter can be configured to transmit an output signal and the signal receiver can be configured to receive the output signal from the signal transmitter. The output signal can comprise a low frequency RF signal.

In various embodiments, the cap comprises an opening configured to fluidly couple the hygroscopic block with an ambient environment. In various embodiments, the hygroscopic block can be a dry compressed towel. The hygroscopic block can be configured to expand with an expansion force and bias the battery in the opposite direction of the spring force. The expansion force can be double the spring force.

An exemplary method of manufacture for a water activated transmitter assembly is disclosed herein. In various embodiments, the method can comprise disposing a hygroscopic block in a cap, coupling a pusher block to the hygroscopic block, coupling a battery to the pusher block, coupling a spring to the pusher block, coupling a transmitter to a casing, and coupling the casing to the cap. In various embodiment, the method of manufacture can further comprise disposing an O-ring between the cap and the casing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
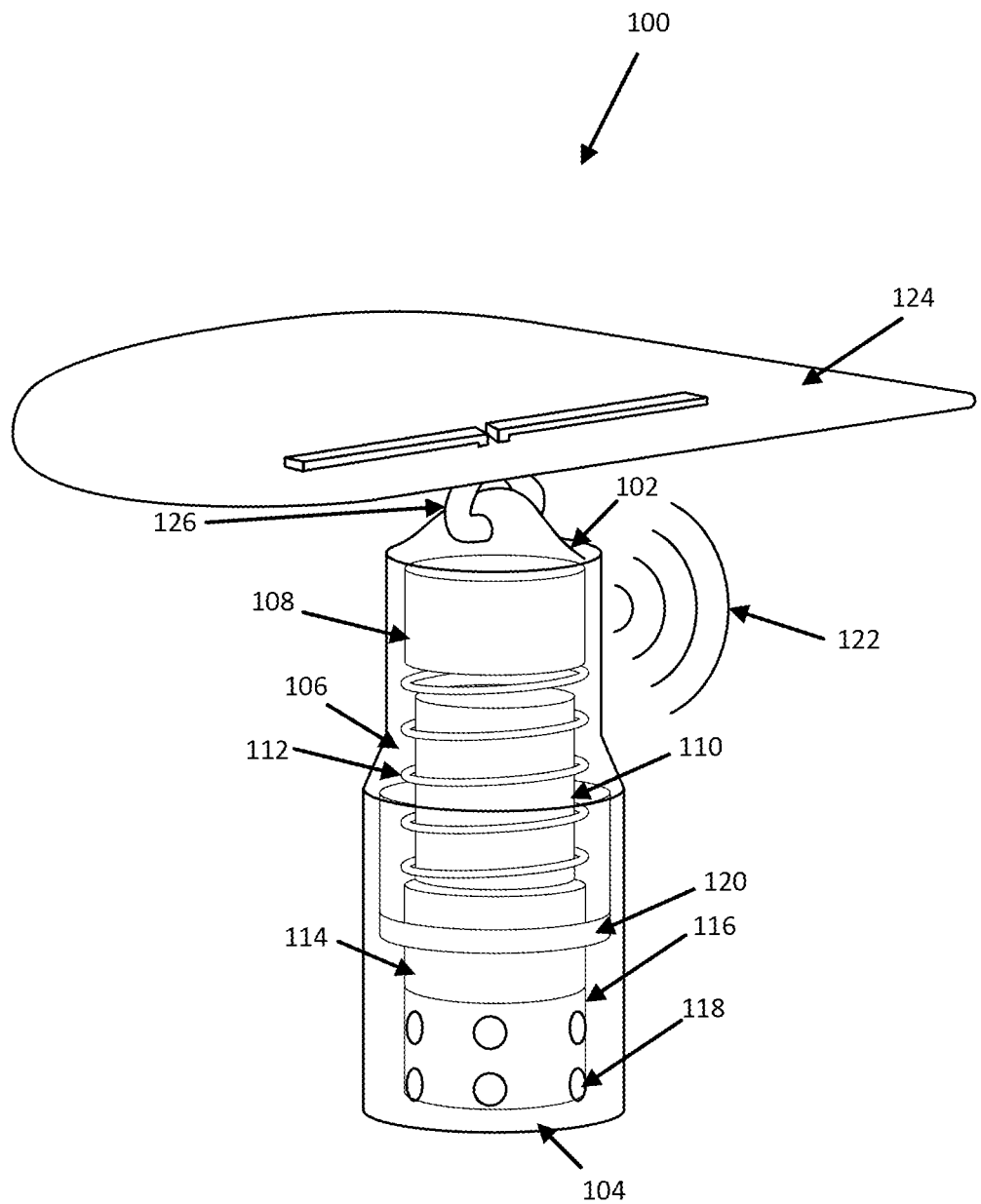
FIG. 1 illustrates a water activated transmitter assembly, in accordance with various embodiments.

FIG. 1 illustrates a water activated transmitter assembly 100 according to various embodiments. The water activated transmitter assembly 100 can comprise a casing 102, a cap 104 coupled to the casing 102 to form a cavity 106, a signal transmitter 108 disposed within the cavity 106, a battery 110 disposed within the cavity 106, a pusher block 114 disposed within the cavity and in contact with the battery 110, a spring 112 disposed between the signal transmitter 108 and the pusher block 114, and a hygroscopic block 116. In various embodiments, an O-ring 120 is disposed within the cavity 106 and in contact with the pusher block 114. The O-ring can form a seal between the casing 102 and the cap 104 in order to prevent water from entering the cavity 106. The spring 112 can be disposed so as to exert a spring force which biases the battery 110 distally away from the signal transmitter 108.

In various embodiments, the cap 104 can comprise an opening 118. The opening is configured to allow water to contact the hygroscopic block 116 in response to the water activated transmitter assembly 100 being exposed to water. In various embodiments, there can be multiple openings 118 or the openings may comprise one, large opening. In various embodiments, the hygroscopic block 116 can comprise any suitable hygroscopic material which expands when exposed to water, for example, a dry compressed towel, a dry compressed cloth, and/or a dry sponge material. In response to exposing the hygroscopic block 116 to water, the hygroscopic block 116 expands and creates an expansion force which biases the pusher block 114 and the battery 110 against the spring 112 and opposes the spring force. In various embodiments, the expansion force is greater than the spring force and in response to the hygroscopic block 116 expanding, hygroscopic block 116 urges the battery 110 in a proximal direction, opposing and overcoming the spring force, causing compression of the spring 113 and causing contact between the battery 110 and the signal transmitter 108.

The signal transmitter 108 is configured to transmit an output signal 122 in response to the battery 110 making contact with the signal transmitter 108. In various embodiments, the output signal 122 can comprise a low frequency radio frequency (RF) signal. The low frequency RF signal can have a frequency between 30 kHz and 300 kHz, or between 45 kHz and 250 kHz, or between 60 kHz and 100 kHz.

The water activated transmitter assembly 100 can comprise a coupling means 126 to couple the water activated transmitter assembly 100 to a patch 124. Patch 124 can be a piece of fabric that can be attached by means such as welding or bonding using adhesives to a water flotation device, such as a raft, an emergency slide or a personal flotation device. Coupling means 126 can comprise any suitable coupling means, such as welding, stitching, or hanging the water activated transmitter assembly 100 on the patch 124.

Figure 2A:
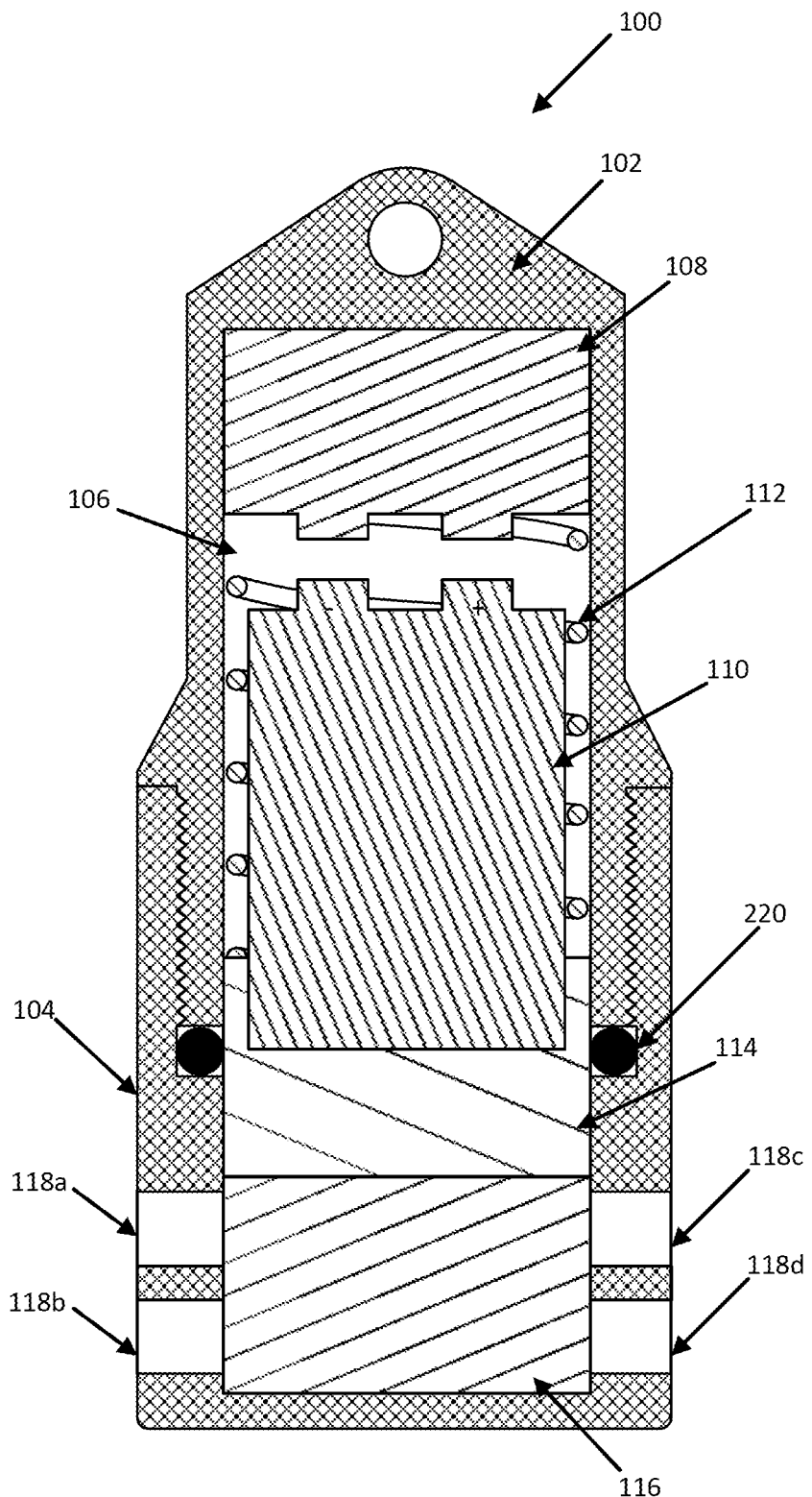
FIG. 2A illustrates the cross-sectional view of a water activated transmitter assembly before activation, in accordance with various embodiments.
Figure 2B:
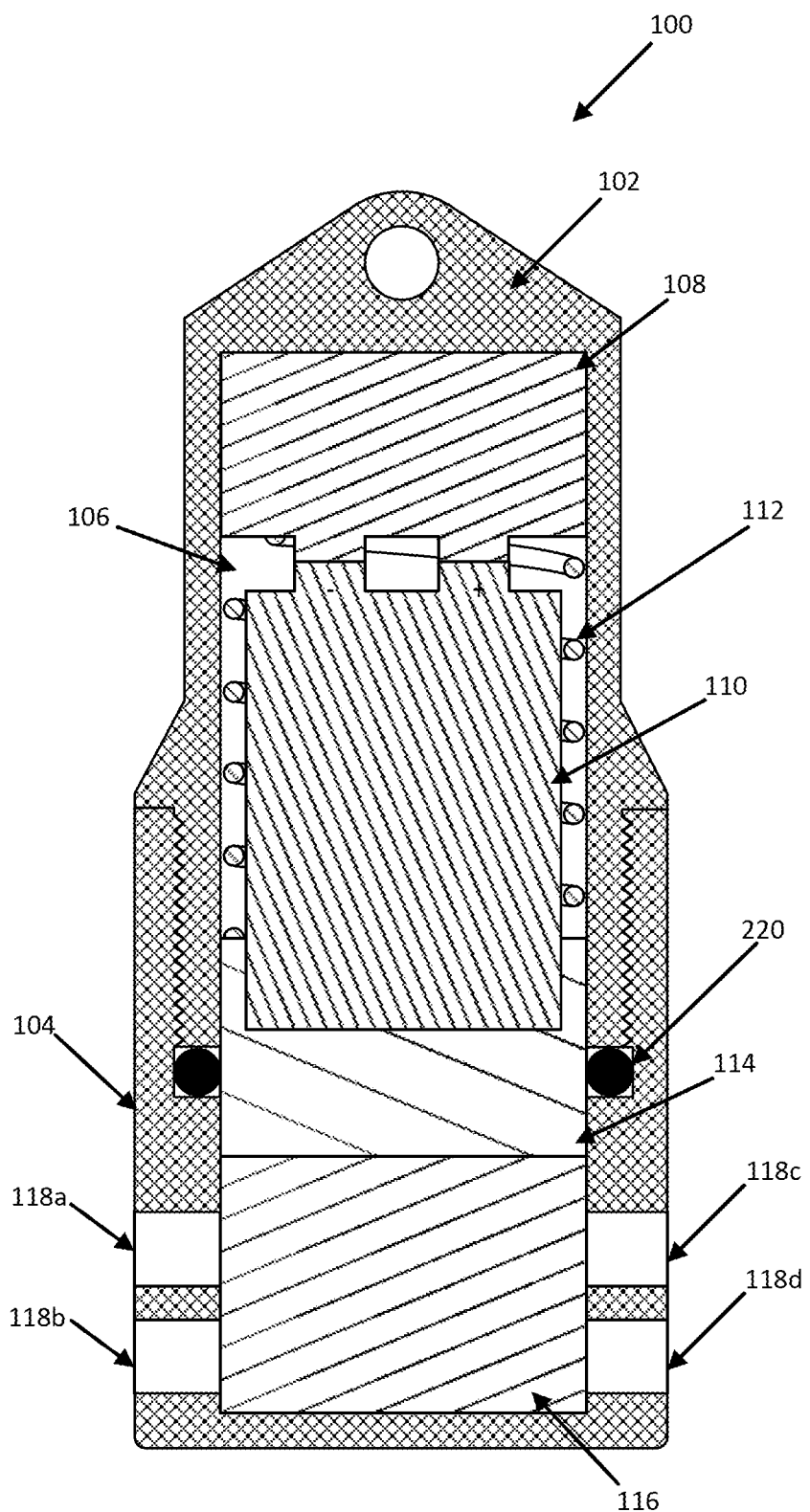
FIG. 2B illustrates the cross-sectional view of a water activated transmitter assembly after activation, in accordance with various embodiments.

In reference to FIG. 2A and FIG. 2B, a cross-section of the water activated transmitter assembly 100 is illustrated according to various embodiments. In various embodiments, an O-ring 220 is disposed within the cavity 106 and in contact with the pusher block 114. The O-ring can form a seal between the casing 102 and the cap 104 in order to prevent water from entering the cavity 106. The spring 112 can be disposed to exert a spring force which biases the battery 110 away from the signal transmitter 108.

In various embodiments, the cap 104 can comprise openings 118a-118d. The openings 118a-118d are configured to allow water to contact the hygroscopic block 116 in response to the water activated transmitter assembly 100 being exposed to water. In various embodiments, the hygroscopic block 116 can comprise the same material as hygroscopic block 116. When the hygroscopic block 116 is exposed to water, the hygroscopic block 116 expands and creates an expansion force which biases the pusher block 114 and the battery 110 against the spring 112 and opposes the spring force. In various embodiments, the expansion force is greater than the spring force and in response to the hygroscopic block 116 expanding, hygroscopic block 116 urges the battery 110 distally into contact with the signal transmitter 108. In various embodiments, the expansion force can be as much as double the spring force. The stronger the expansion force, the faster the battery can contact the transmitter.

In various embodiments, the signal transmitter 108 can have the same properties as signal transmitter 108. FIG. 2A illustrates the water activated transmitter assembly 100 prior to exposing the hygroscopic block 116 to water to activate the signal transmitter 108. FIG. 2B illustrates the water activated transmitter assembly 100 after the hygroscopic block 116 is exposed to water and the hygroscopic block 116 expands to bias the battery 110 into contact with the signal transmitter 108, thus activating the signal transmitter 108 to send an output signal such as output signal 122.

Figure 3:
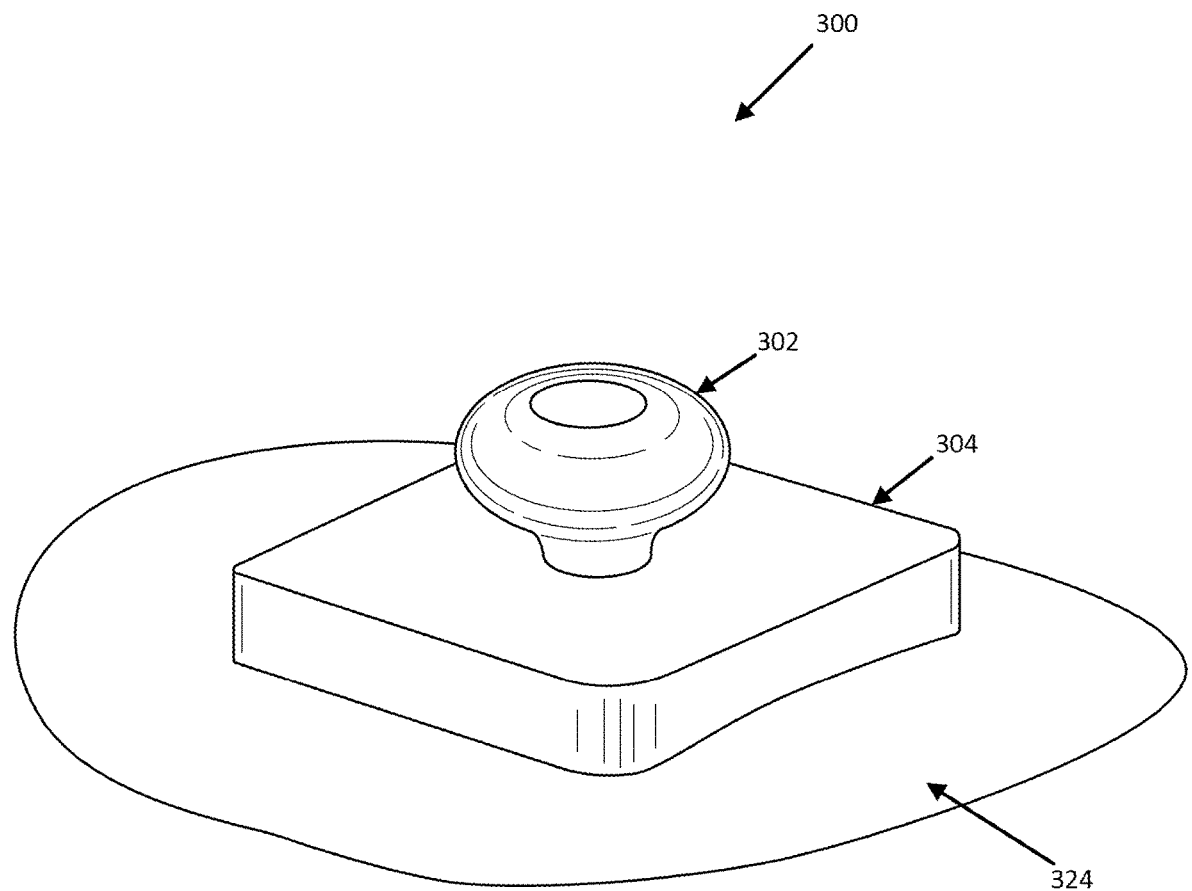
FIG. 3 illustrates a wireless light assembly, in accordance with various embodiments.
Figure 4:
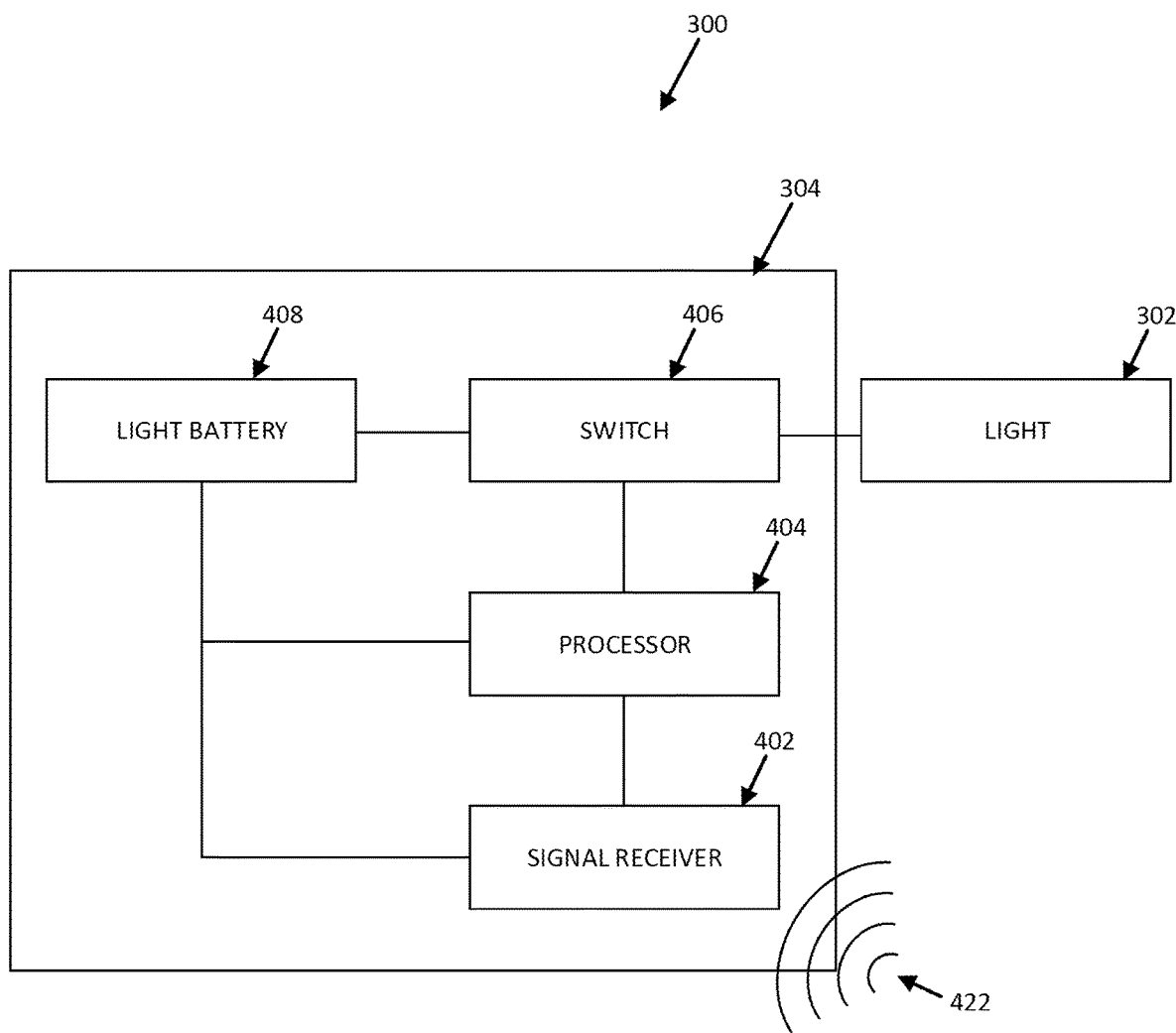
FIG. 4 illustrates a block diagram of the components of the wireless light assembly, in accordance with various embodiments.

In reference to FIG. 3 and FIG. 4, a wireless light assembly 300 is illustrated according to various embodiments. In various embodiments, the wireless light assembly 300 can comprise a light 302 coupled to a battery control unit 304. The battery control unit 304 can be coupled to a patch 324. Patch 324 can be a piece of fabric that can be attached by means such as welding or bonding using adhesives to a water flotation device, such as a raft, an emergency slide or a personal flotation. In various embodiments, the light 302 can be an LED, an incandescent bulb, a halogen bulb, and a fluorescent bulb. FIG. 4 further illustrates a block diagram of the components of the wireless light assembly 300. In various embodiments, the battery control unit 304 can comprise a signal receiver 402, a processor 404 in communication with the signal receiver 402 and a switch 406, and a light battery 408 in communication with the signal receiver, the processor, the switch, and the light.

In various embodiments, the light battery 408 can power the processor 404 and the signal receiver 402. In various embodiments, the light battery 408 may not power the processor 404 and the signal receiver 402 until the water flotation device is deployed or inflated. The signal receiver 402 can be configured to receive an output signal 422. In various embodiments, output signal 422 can be the same output signal as output signal 122 from signal transmitters 108 and 108. In various embodiments, when the signal receiver 402 receives the output signal 422, the signal receiver then sends a command to processor 404 to close switch 406. Closing switch 406 completes the connection between the light battery 408 and the light 302, and the light 302 is then powered on.

Figure 5:
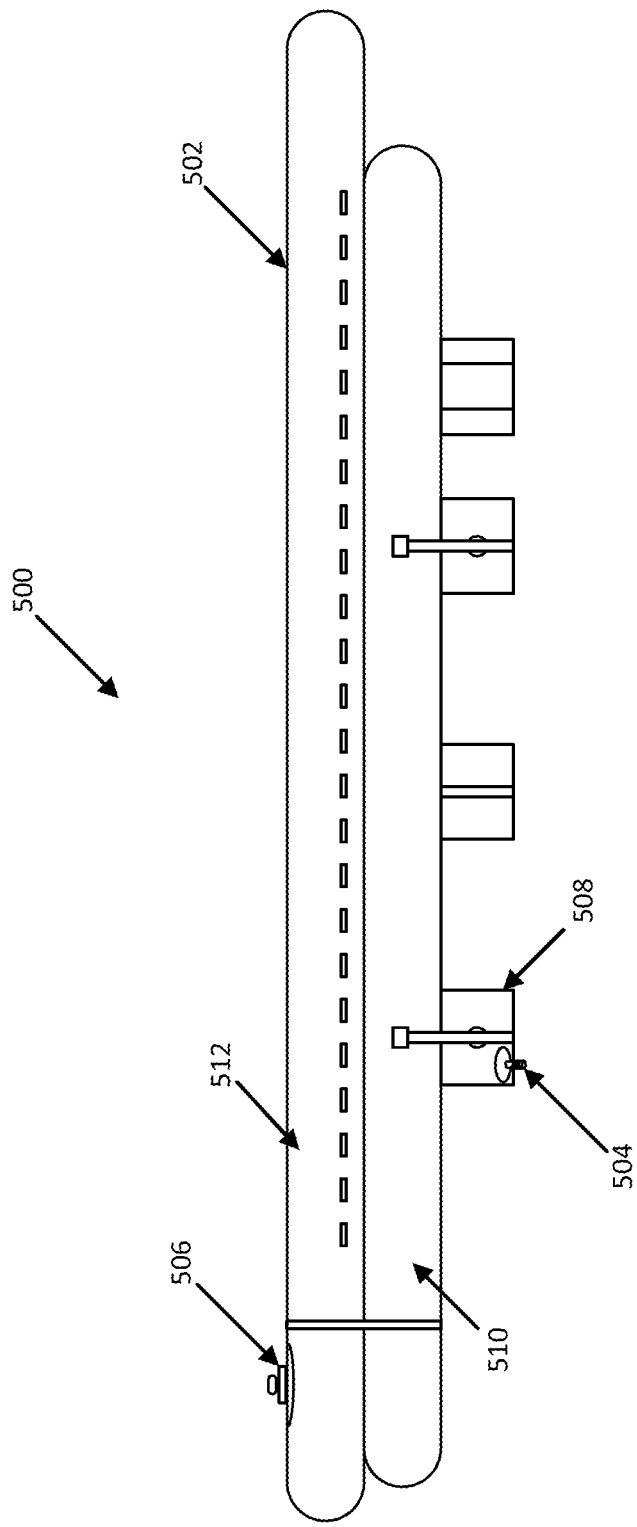
FIG. 5 illustrates a side view of a water emergency device system, in accordance with various embodiments.

In reference to FIG. 5, a water emergency device system 500 is illustrated. In various embodiments, the water emergency device system 500 comprises a water flotation device, a water activated transmitter assembly 504, and a wireless light assembly 506. In various embodiments, the water flotation device is illustrated as a raft 502. In various embodiments, the water flotation device can comprise any personal flotation device, such as a life jacket or floaties, or an inflatable slide used in aircraft emergencies. In various embodiments, the water activated transmitter assembly 504 can be the water activated transmitter assembly 100. In various embodiments, the wireless light assembly 506 can be the wireless light assembly 300. In various embodiments, the raft 502 can comprise a pillow tube 508 coupled to a lower tube 510, and the lower tube 510 can be coupled to an upper tube 512.

In various embodiments, the water activated transmitter assembly 504 can be coupled to the raft 502 at the pillow tube 508. Coupling the water activated transmitter assembly 504 to the pillow tube 508 helps to quickly expose the water activated transmitter assembly 504 to water if the raft 502 is placed in a body of water. In various embodiments, the wireless light assembly 506 can be coupled to the raft 502 at the upper tube 512. Coupling the wireless light assembly 506 to the upper tube 512 allows for the wireless light assembly 506 to be more visible when the wireless light assembly 506 is powered on. FIG. 5 illustrates one wireless light assembly 506, however, in various embodiments, multiple wireless light assemblies can be coupled to the water flotation device. In various embodiments, multiple wireless light assemblies can be powered on by one water activated transmitter assembly.

Figure 6:
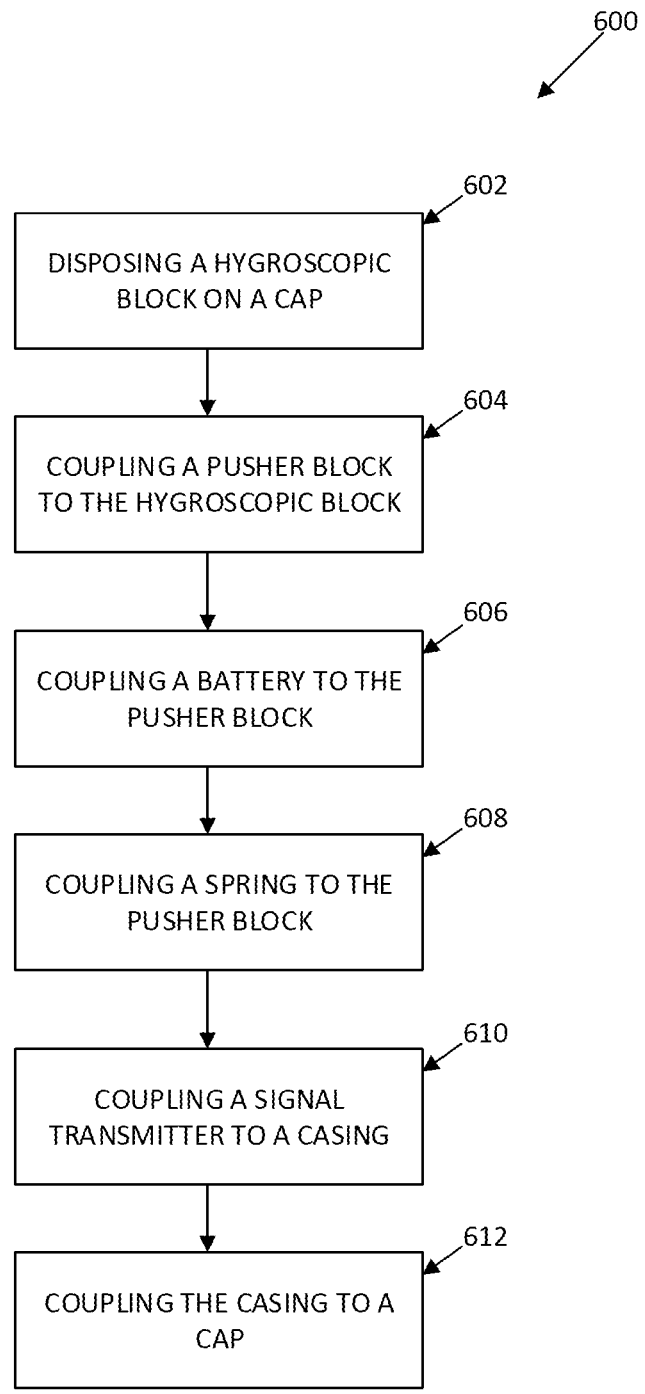
FIG. 6 illustrates a method of manufacture of a water activated transmitter assembly, in accordance with various embodiments.

With reference to FIG. 2 and FIG. 6, a method of manufacture 600 for forming a water activated transmitter assembly is disclosed. Method of manufacture 600 includes the steps of disposing a hygroscopic block (shown as hygroscopic block 116) in a cap (shown as cap 104) (step 602), coupling a pusher block (shown as pusher block 114) to the hygroscopic block (step 604), coupling a battery (shown as battery 110) to the pusher block (step 606), coupling a spring (shown as spring 112) to the pusher block (step 608), coupling a signal transmitter (shown as signal transmitter 108) to a casing (shown as casing 102) (step 610) and coupling the casing to the cap (step 612). In various embodiments, the method of manufacture 600 further comprises disposing an O-ring between the cap and the casing prior to step 612 to create a seal when the cap and casing are coupled together. In various embodiments, the cap and the casing can comprise grooves. The grooves can be used to couple the cap and the casing together in step 612 by screwing the casing into the cap.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 36 U.S.C. 112(f) unless the element is expressly recited using the phrase "means for." As used herein, the terms "comprises", "comprising", or any other variation thereof, are intended to cover a non-exclusive inclusion, such that a process, method, article, or that comprises a list of elements does not include only those elements but may include other elements not expressly listed or inherent to such process, method, article, or apparatus.

The invention claimed is:

1. A water activated transmitter assembly, comprising:
   a casing;
   a cap coupled to the casing to form a cavity;
   a signal transmitter disposed within the cavity;
   a battery disposed within the cavity, wherein the battery is disposed distally to the signal transmitter and biased away from the signal transmitter by a spring;
   a pusher block disposed within the cavity distal to the battery; and a hygroscopic block disposed within the cavity and distal to the pusher block.

2. The water activated transmitter assembly of claim 1, wherein the cap comprises an opening configured to fluidly couple the hygroscopic block with an ambient environment outside the casing.

3. The water activated transmitter assembly of claim 2, wherein the water activated transmitter assembly further comprises an O-ring disposed within the cavity and in contact with the pusher block.

4. The water activated transmitter assembly of claim 3, wherein the signal transmitter is configured to transmit an output signal.

5. The water activated transmitter assembly of claim 4, wherein the output signal comprises a low frequency RF signal.

6. The water activated transmitter assembly of claim 5, wherein the hygroscopic block comprises a dry compressed towel, a dry compressed cloth, and/or a dry sponge material.

7. The water activated transmitter assembly of claim 6, wherein the hygroscopic block is configured to expand with an expansion force and urge the battery to move proximally toward the signal transmitter.

8. The water activated transmitter assembly of claim 7, wherein the expansion force is double the spring force.

9. A water emergency device system, comprising:
a water flotation device;
a water activated transmitter assembly coupled to the water flotation device, wherein the water activated transmitter assembly comprises:
a casing;
a cap coupled to the casing to form a cavity;
a signal transmitter disposed within the cavity;
a battery disposed within the cavity, wherein the battery is disposed distally to the signal transmitter and biased away from the signal transmitter by a spring;
a pusher block disposed within the cavity distal to the battery; and
a hygroscopic block disposed within the cavity and distal to the pusher block a wireless light assembly coupled to the water flotation device.

10. The water emergency device system of claim 9, wherein the wireless light assembly comprises:
a light; and
a battery control unit coupled to the light.

11. The water emergency device system of claim 10, wherein the battery control unit comprises:
a signal receiver;
a processor, in communication with the signal receiver and a switch; and
a light battery, in communication with the switch and the light.

12. The water emergency device system of claim 11, wherein the signal transmitter is configured to transmit an output signal and the signal receiver is configured to receive the output signal from the signal transmitter.

13. The water emergency device system of claim 12, wherein the output signal comprises a low frequency RF signal.

14. The water emergency device system of claim 13, wherein the water flotation device is a raft.

15. The water emergency device system of claim 14, wherein the cap can comprise an opening configured to fluidly couple the hygroscopic block with an ambient environment.

16. The water emergency device system of claim 15, wherein the water activated transmitter assembly further comprises an O-ring disposed within the cavity and in contact with the pusher block.

17. The water emergency device system of claim 16, wherein the hygroscopic block comprises a dry compressed towel.

18. The water emergency device system of claim 17, wherein the hygroscopic block is configured to expand with an expansion force and urge the battery to move proximally toward the signal transmitter.

19. A method of manufacture for a water activated transmitter assembly, the steps comprising:
disposing a hygroscopic block in a cap;
coupling a pusher block to the hygroscopic block;
coupling a battery to the pusher block;
coupling a spring to the pusher block;
coupling a signal transmitter to a casing; and
coupling the casing to the cap.

20. The method of manufacture of claim 19, further comprising disposing an O-ring between the cap and the casing.

* * * * *